Sept. 1, 1942.  H. BELAR  2,294,376
PHOTOCELL HUM DEMODULATOR
Filed July 31, 1941
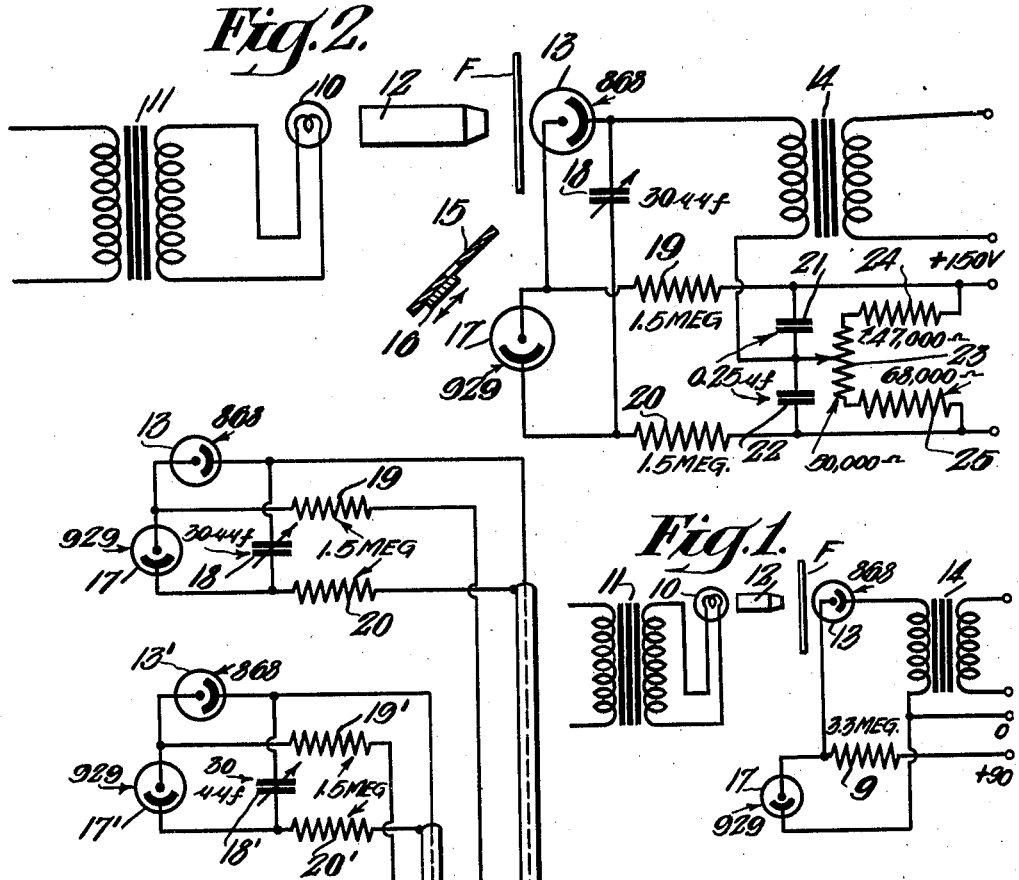
Inventor
Herbert Belar
By
Attorney Patented Sept. 1, 1942

2,294,376

UNITED STATES PATENT OFFICE 2,294,376

PHOTOCELL HUM DEMODULATOR

Herbert Belar, Philadelphia, Pa., assignor to Radio Corporation of America, a corporation of Delaware Application July 31, 1941, Serial No. 404,857

3 Claims. (Cl. 250—41.5)

This invention relates to a hum demodulator for eliminating by demodulation the hum which is produced in photocell circuits by the variation in intensity of an A.-C. operated exciter lamp.

It is highly desirable to use alternating current to operate the exciter lamp in photo-electric apparatus, such as film sound reproducers, and analogous devices. A light of high intrinsic brilliance is required and this can be most readily secured in an incandescent lamp having a relatively short and heavy coil filament, such, for example, as a 10 volt, 5 ampere, single coil filament lamp, or a 10 volt, 7.5 ampere, coil filament lamp. Due to the heavy current required by these lamps it is rather expensive to supply them with direct current from a source such as a storage battery, rectifier or motor generator set, both the investment and upkeep cost being high in proportion to the total current used. The most satisfactory arrangement is to provide the current by a step-down transformer from the usual A.-C. supply means. The use of A.-C. on the exciter lamp, however, has the disadvantage that the light fluctuates in intensity at a rate corresponding to the fluctuations in current and this produces a hum in the photocell output circuit.

It has heretofore been proposed to eliminate the hum produced in the photocell by bucking it out by an equal amount of hum of opposite phase produced by a second photocell energized by the same exciter lamp. Such an arrangement is unsatisfactory in that the circuit can be balanced for only a single light intensity. For example, light would be admitted to the balancing photocell in a certain quantity which would balance the hum in the main photocell at some predetermined point, such as maximum, minimum, or intermediate illumination. When modulation is then applied to the illumination of the main photocell the light intensity changes and a hum is introduced proportional to the deviation of the average light intensity from the intensity for which the balance was secured.

In the present arrangement a modulation is applied by a second photocell to the supply current of the photocell which is to be modulated. Since the current drawn by the photocell is proportional to the illumination, this modulation which is in reverse phase produces a corresponding demodulation of the photocell output and will materially decrease the hum at all degress of illumination and can be made to balance it out exactly at two or more points.

In addition to this demodulation, the invention covers an improved circuit which neutralizes the effective capacity of the photocell and its circuit so that any tendency for modulation to be introduced in the output circuit through the capacity of the photocell is substantially eliminated.

One object of the invention is to provide an improved hum demodulator for photocell circuits.

Another object of the invention is to provide an improved capacity balancing circuit for photocell circuits.

Another object of the invention is to provide an improved method of and apparatus for eliminating hum in the output of a photocell excited by an A.-C. exciter lamp.

Another object of the invention is to provide a means of reducing fluctuation in soundhead output or photocell output with variation in light output due to the lamp itself or the line voltage.

Other and incidental objects of the invention will be apparent to those skilled in the art from a reading of the following specification and an inspection of the accompanying drawing, in which:

Figure 1 is a schematic diagram of my improved hum demodulator circuit,

Figure 2 is a schematic diagram of the improved hum demodulator circuit including the photocell capacity balancing arrangement, and Figure 3 is a schematic diagram of the hum demodulator with the capacity balancing arrangement as applied to a pair of soundheads with a level balancing device between the two soundheads.

Referring first to the arrangement shown in Fig. 1, the exciter lamp 10 is energized by alternating current fed through it through the transformer 11. This exciter lamp may be one of the usual types of exciter lamp, such as a 10-volt, 5 ampere, or 7.5 ampere exciter lamp. Light from the exciter lamp is directed by the optical system 12 through the sound film F onto the photocell 13, which may be one of the gas type photocells, such as that known commercially as the type 868. The sound modulated output from the photocell 13 is passed through the transformer 14 to the input of the audio frequency amplifier since it is directed to such apparatus as it may be desired to operate by the photocell output. Such apparatus would include loudspeakers or other sound reproducers, sound recording or rerecording apparatus, or any other type of acoustically operated translating device.

A second photocell 17 is located in some appropriate relation to the lamp 10 so as to receive light therefrom. This second photocell 17 is preferably of the type having a higher conductivity and it may be of a type having a different shape of characteristic curve than the photocell 13. A type 929 high vacuum photocell has been found satisfactory for the photocell 17. The supply to both photocells from the D.-C. power supply passes through the 3.3 megohm resistor 9.

It will be apparent that if the light from the source 10 increases, the conductivity of the cell 17 will increase as will the conductivity of the cell 13. However, since the conductivity of the cell 17 increases more than that of the cell 13 it produces a voltage drop across the resistor 9 sufficient to decrease the output of the cell 13 by the same amount as it would have been raised by the increase in illumination and the output of the cell 13 therefore remains constant. This applies over a limited range for a change in illumination of the lamp 10 whether the lamp 10 be actuated with A. C. or D. C. Since it is true of variation in average level of the lamp it is equally true of variation in instantaneous level of the brightness and will balance out hum which would tend to be introduced into the output transformer 14 by variations in intensity of the lamp 10. It should be noted that this demodulation is independent of the illumination applied to the cell 13 and the balancing can be secured over a very considerable range of light transmission of the film F.

The foregoing arrangement is subject to the limitation that even when the photocell 13 is completely dark there is still a certain amount of capacity between the anode and cathode of the cell and also a certain amount of capacity between the terminals in the socket which carries the cell and in the lines. Since the modulation applied to the cell 17 by the light 10 remains constant even though the light to the cell 13 is cut off by the film, this modulation will be fed to the output circuit of the photocell 13 through the capacity just described and will accordingly tend to produce some hum.

This capacity feed of hum into the output circuit is neutralized in the modification shown in Fig. 2 which falls within the scope of the present invention, but is more specifically claimed in the concurrently filed application of R. A. Bierwirth Serial No. 404,805.

In Fig. 2 the parts insofar as they are similar to those in Fig. 1 are represented by the same reference numerals and the description of those parts is not repeated here. In the arrangement shown in this figure there is provided a diaphragm 15 with an adjustable member 16 for regulating the amount of light striking the photocell 17 from the source 10 and thereby regulating the current drawn by this photocell. In this circuit the two 1.5 megohm resistors 19 and 20 are substituted for the single resistor 9 of Fig. 1 and the photocell current is applied by a regulating potentiometer which forms no part of the invention. The regulating potentiometer includes the series resistors 24 and 25 which have the value shown in the drawing and the potentiometer 23 from which the desired voltage is applied to the photocell 13. The potentiometer is provided with by-pass capacitors 21 and 22 as indicated. These capacitors 21 and 22 serve to effectively short-circuit the resistors 23, 24 and 25 as far as any hum modulation or audio frequency output is concerned. The feature of this circuit differing from that of Fig. 1 is that the variable capacitor 18 may have a maximum value of approximately 30 $\mu\mu f$. In the arrangement shown it will be apparent that there is effectively a bridge circuit in which the resistors 19 and 20 serve as the ratio arms and the capacitor 18 is balanced against the capacitance of the photocell 13 with its attendant socket and connections. The photocell 17 serves as a variable load across the middle of the bridge and functions as a demodulator as before described. With this arrangement illumination is applied to the photocell 17 while the light is prevented from reaching the cell 13 and the capacitor 18 is then adjusted to secure minimum hum. The light may then be permitted to fall on the cell 13 and the adjustable member 16 of the diaphragm 15 is adjusted to secure minimum hum in the output with maximum illumination on the cell 13.

The form of the invention shown in Fig. 3 includes all the features shown in Fig. 2 except that resistance coupling is used instead of transformer coupling and the arrangement is shown as applied to a pair of soundheads.

In this figure, the parts indicated by the reference numerals of the upper soundhead indication correspond to the parts indicated by those reference numerals in Fig. 2 and function in the same manner. In the lower soundhead representation, the corresponding parts are indicated by the same numbers each, with a prime (') added.

In the lower left hand part of this figure is shown a voltage regulated power supply for maintaining the voltage applied to the photocells substantially constant. In this arrangement a voltage of over 150 volts is applied through the leads in the left hand side of the figure through the dropping resistor 28 and a regulating tube 29 which is of the VR-150 type is connected as shown so as to maintain a constant voltage of 150 volts on the input leads. The resistors 26 and 27 serve as a voltage divider and the voltage at their connection is applied to the midtap of the potentiometer 30. This potentiometer 30 is also provided with a movable slider, as indicated, which is connected through the resistor 31 to the +150 volt lead. From the upper end of the potentiometer 30 potential is applied through the resistors 32 and 33 to the photocell 13' while from the lower end of the potentiometer 30 potential is applied through the resistors 34 and 35 to the photocell 13. These resistor arrangements are by-passed by appropriate capacitors 36 and 37, which, as indicated, may have a value of 1.0 $\mu f$. The first tube 38 of the amplifier is shown and this is provided with the usual bias resistor 39 in the cathode circuit which is by-passed by an appropriate capacitor 40, the grid being connected to the B-lead by the resistor 41. The plate circuit from this tube, of course, goes to an appropriate output circuit and power supply. The output from the tube 13 is connected to the grid of the tube 38 through the capacitor 42 and the output from the tube 13' is connected to the tube 38 through the capacitor 43, both of these capacitors having preferably a value of the order of .05 $\mu f$.

It will be apparent that the arrangement shown in Fig. 3 presents all the advantages of the circuit shown in Fig. 2 in that the capacitance of the phototubes 13 and 13' are balanced by the capacitors 18 and 18', respectively, and in addition the output from the tubes 13 and 13' can be balanced with each other by means of the potentiometer 30.

I claim as my invention:

1. In combination, a photocell having a D.-C. supply circuit and an A.-C. output circuit, an exciter lamp arranged to illuminate said photocell, means in said supply circuit limiting the current supplied to said photocell, and means actuated by said exciter lamp and diverting a portion of said supplied current in proportion to the brightness of the exciter lamp.

2. In combination, a photocell having a D.-C. supply circuit and an A.-C. output circuit, an exciter lamp arranged to illuminate said photocell, means in said supply circuit limiting the current supplied to said photocell, and means actuated by said exciter lamp and diverting a portion of said supplied current in proportion to the brightness of the exciter lamp, whereby the potential applied to said photocell decreases when the brightness of the exciter lamp increases.

3. In combination, an exciter lamp, a photocell connected to an output circuit and arranged to be illuminated by said exciter lamp, an input circuit for said photocell having a resistor therein, a second photocell arranged to be also illuminated by said exciter lamp and connected to said input circuit and resistor, whereby variations in brightness of said exciter lamp will produce corresponding inverse variations in the potential applied to the photocell connected to said output circuit.

HERBERT BELAR.